United States Patent [19]

Amano

[11] Patent Number: 5,033,104
[45] Date of Patent: Jul. 16, 1991

[54] METHOD FOR DETECTING CHARACTER STRINGS

[75] Inventor: Tomio Amano, Yokohama, Japan

[73] Assignee: International Business Machines Corporation, Armonk, N.Y.

[21] Appl. No.: 321,036

[22] Filed: Mar. 9, 1989

[30] Foreign Application Priority Data

Mar. 25, 1988 [JP] Japan .................................. 63-69969

[51] Int. Cl.$^5$ ............................................. G06K 9/36
[52] U.S. Cl. .................................... 382/56; 358/261.1
[58] Field of Search ....................... 382/22, 25, 48, 56, 382/61; 358/261.1

[56] References Cited

U.S. PATENT DOCUMENTS

4,229,768 10/1980 Kurahayashi et al. ............... 382/56
4,517,604 5/1985 Lasher et al. .......................... 382/56

Primary Examiner—David K. Moore
Assistant Examiner—Jose L. Couso
Attorney, Agent, or Firm—Philip J. Feig

[57] ABSTRACT

A method for detecting character string regions in a document image containing figures and illustrations includes storing image data of the document, generating position data of a run of black pixels in each line by accessing the stored image data, comparing runs of black pixels for each pair of two adjoining lines and determining whether a run is a boundary candidate, and generating a rectangle whose boundaries include at least a pair of boundary candidates determined to be a character string region.

12 Claims, 13 Drawing Sheets

ORIGINAL IMAGE

FIG. 9B

DETECTED UPPER AND LOWER BOUNDARY CANDIDATES (HAVING A LENGTH OF 2 OR GREATER)

FIG. 9C

EXAMPLE WHEREIN GAPS IN THE VERTICAL DIRECTION OR DISCONNECTIONS WERE CORRECTED WITH RESPECT TO UPPER BOUNDARY CANDIDATE

METHOD FOR DETECTING CHARACTER STRINGS

FIELD OF THE INVENTION

This invention is related to a method for detecting character strings n a document image containing figures and illustrations.

BACKGROUND OF THE INVENTION

Recently, it has become possible for various documents (such as manuals and design drawings) in an office to be electronically stored (e.g. by an optical filing system or the like) and transmitted (e.g. by a facsimile), and so-called paperless offices are now increasing. However, at present, a document is treated as monochromatic image information, but processing at a more advanced level than the cutting-and-pasting of images and with more effective storage and transmission will necessitate structurization of image information (e.g. conversion to multi-media information including character codes and graphic commands). In the structurization process of image information, an operation for extracting only character strings from an image including figures and illustrations, for instance by seeking the position data of a rectangle framing of the character strings in the image, is often carried out first.

For example, in the automatic screen entry system for CAD/CAM, it is necessary for the character strings and line diagrams in a drawing to be identified after they are separated, and the same applies to the region dividing an image of a newspaper, magazine or the like (dividing an image into regions such as characters, diagrams and photographs), information as to whether or not character strings exist in a certain region is very useful. In addition, current optical character recognition systems, OCRs, have so far been handling documents containing only printed characters, a process is being sought which automatically disregards logotypes, signatures, underlines and the like and recognizes only characters.

However, since the character extracting process handles a whole image, it is a process which requires considerable time. Moreover, since recognition of printed alphanumeric characters is presently performed by software on a personal computer, it is also desirable for the character extraction to be performed on a personal computer, and have a high-speed character extraction system. The character extraction method can be divided into the following two steps:

1) Detect the character strings in an image, and
2) Determine the accurate position and size of the framing rectangles of the character strings.

The character string detection of the first step requires scanning of the image in order to obtain general information concerning the position data of the character strings. In the second step, little time is required because the processing is performed based on the information (such as coordinates and sizes) obtained in the first step. Therefore, it is the character string detection process in the first step which burdens the CPU. A high-speed character string detection system not requiring expensive specialized hardware or a host computer is essential to permit applications of the structurization of image information to become more readily accepted in offices.

The conventional character string detection methods are as follows. (Another method utilizing the knowledge specific to the drawing is omitted.)

Method which uses histograms

An image is scanned to count the number of black pixels and the character strings are detected from the histograms. This method is most frequently used for an image comprising only characters. For an image including figures and characters, a method was proposed which seeks regions of character strings only while changing the area to be scanned and preparing histograms for several scans. The article, Masuda, Hagita, Akiyama; "Approach to Smart Document Reader System"; Proc. Conference CVPR, San Francisco, 1985; pp. 550–557 is a reference describing this method.

Method which considers the size of a figure

Figure 12:
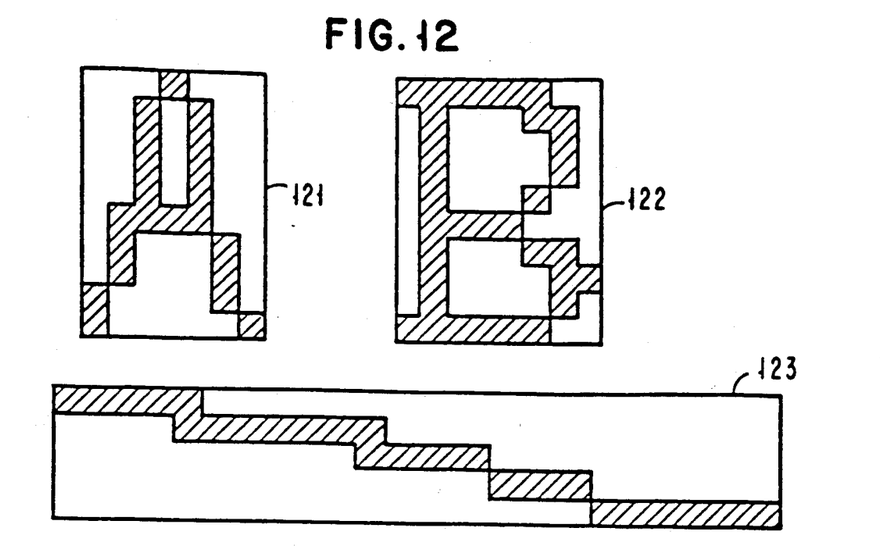
FIGS. 12, 13 and 14 are figures illustrating prior art methods.

As shown in FIG. 12, connected black pixels are traced to find rectangles (121, 122, 123) framing the connected pixel regions. Since the connected black pixel regions of characters are smaller than the connected black pixel regions of other figures, the characters can be identified from the size of the framing rectangles. This method is used in many systems. The publication, Rosenfeld, Kak; "Digital Picture Processing"; Academic Press, New York, 1976 is a reference describing this method.

Method which considers the complexity of a figure

The complexity of a figure is examined in a neighborhood of black pixels to determine if the pixels constitute a character. A region in which black pixels are concentrated is considered to be a character region. In the case of a complex figure, neighborhood line density is used, for example, for all the pixels in the image. Scanning is performed in four directions, up, down, left and right, centered around a pixel to count the number of times the pixel changes from white to black, which number will be used as a scale for the complexity of a figure.

Figure 13:
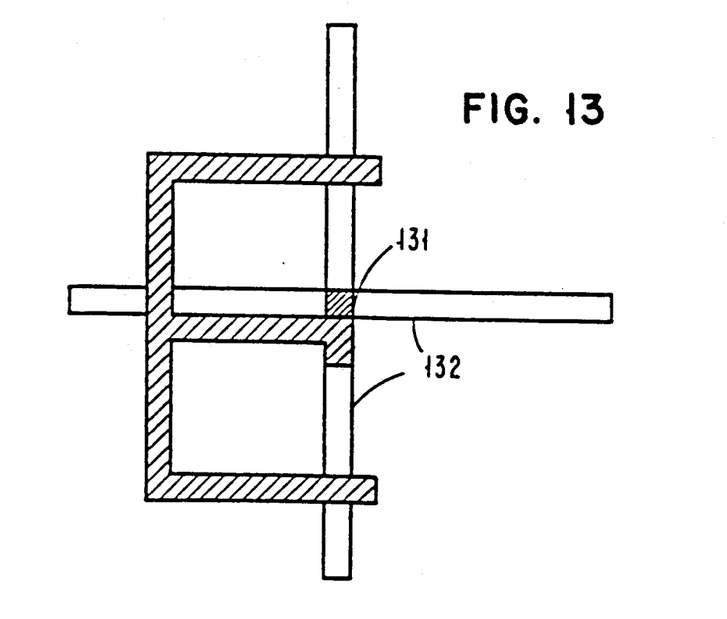

In FIG. 13, for example, scanning is performed in the region represented as region 132, centered around a black pixel 131 which pixel is currently being considered. White changes to black three times in the scanning range, so the neighborhood line density is 3. A black pixel having a high neighborhood line density is judged to be a pixel which constitutes a character. The article, Kubota, Iwaki, Arakawa; "Document Understanding System"; 7th ICPR, Montreal, 1984; pp. 612–614 is a reference describing this method.

Method of detecting character strings from a preprocessed image

Figure 14:
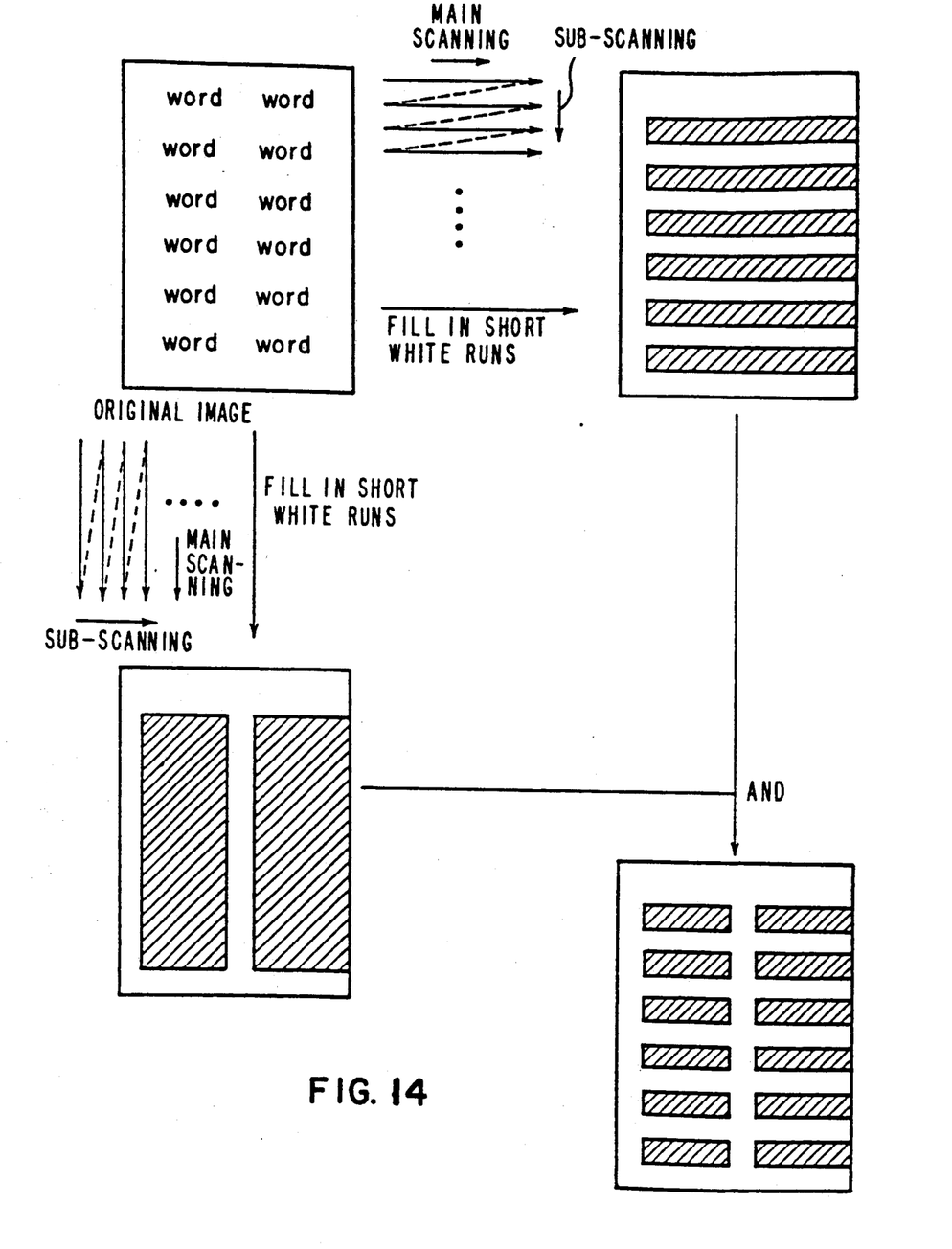

An image is generated in which white pixels between closely spaced black pixel regions are replaced by black pixels (as a result, the characters in a character string are connected to become one black pixel region). The determination of whether the pixels are character strings or not character strings is based upon the shape and size of the region having the black pixels connected in the image. The method of replacing white pixels with black pixels is often accomplished by run-length smearing. Run-length smearing is a process where, as shown in FIG. 14, first an image is raster-scanned to provide an image in which all the white runs except those longer than a certain length are replaced by black pixels, then the directions of the main scanning and sub-scanning are changed and another raster scan is performed to achieve a similar processing, and thereafter the two images are ANDed together. The article, Wong, Casey, Wahl; "Document Analysis System; IBM J. RES. DE- VELOP; Vol. 26, No. 6, pp. 647–656; 1982/11 is a reference describing this method.

Also, there are systems which use a combination of these methods or those which feed back the results of segmentation and recognition of the respective characters to correct an earlier result.

The problems encountered when using the conventional methods in terms of the speed and detection precision are described below.

The speed of character string detection depends heavily upon the number of times the image is accessed and the unit used in processing the image. Preferably, the number of times the image is accessed is one raster scan and the unit of processing the image is the same as the unit of data processing in a general-purpose processor [byte (8 bits) or word (16 bits)].

In the first method described above, a number of scans are required to segment the regions of figures and pictures, and the number of times increases as the number of the regions of figures and pictures in the image increases. In the second method described above, the framing rectangle of a connected region can be obtained by one scan but, a complex data structure is required to store the intermediate result. In the third method described above, in addition to the fact that the image needs to be scanned once, each time a black pixel is found, access occurs in the direction up, down, left and right from the pixel in the case of neighborhood line density. In the fourth method described above, scanning is required three times in the preprocessing and one time in checking the connected region, for a total of four scans.

Regarding the unit of processing, processing on the basis of byte (word) unit by table look-up is available in the first method. In the second, third and fourth methods, when scanning the image, it is necessary to check for every pixel whether it is white or black. In the fourth method, byte-by-byte or word-by-word processing is available in the preprocessing, but the checking process of the connected region is performed pixel by pixel.

Therefore, in the second, third and fourth methods, the image data must be handled bit by bit. There is no conventional method which has accomplished an optimum combination of the number of the times to access the image and the processing unit. Hence, an engineering workstation or dedicated hardware is required to attain sufficient speed.

In comparing the precision of character string detection methods, two criteria can be considered. One is whether there is no detection failure, and the other is whether no unnecessary figure is detected as a character string. Since excess detection can easily be found and corrected in the course of determining the framing rectangle, and segmenting and recognizing the individual characters, detection failure is described hereinafter.

In the first method, character strings are detected from the crest and trough of a histogram, therefore, when character strings are scattered among illustrations, there is a possibility that the character strings will not be found.

In the second and fourth methods, a problem occurs if a character is in contact with another figure. The framing rectangle of the character in contact with a figure becomes large and is judged not to be a character. A method of tracing the boundary of black pixel regions to separate the contact portions (Mukoda, Suzuki, Abe; "Separation of a Character and a Figure Using Boundary Tracing—In the Case that the Character and the Figure are in Contact"; 28th National Conference of the Information Processing Association; IN-4, 1984/3) has also been proposed, but the process takes too much time and part of the figure may be cut off.

In the fourth method, since the frequency of a character being in contact with another figure increases due to the preprocessing, the possibility of detection failure becomes greater.

In the third method, the complexity of a string of characters of a simple structure, such as numerics, is reduced, resulting in making it more difficult to identify the string of characters from other figures.

The present invention overcomes the above limitations and problems in the following manner. Character strings appearing in many documents generally have the following properties:

1) Characters are usually written horizontally or vertically;

2) The heights of characters when horizontally written and the widths of characters when vertically written are generally uniform in a character string, and 3) Above, below, to the left and right of a particular character string, there is a white run separating other figure elements. (A connected region of white pixels does not always exist around the character string.) Accordingly, an individual character string region in an image can be approximately represented by an elongated rectangle. To detect the character string, only detection of the upper and lower sides (when horizontally written) or the left and right sides (when vertically written) of this rectangle is required.

In the preferred embodiment, the detection of the sides of the character strings is performed by applying low bus filtering to the white run, assuming an image in which the space within the character string region is filled with black pixels, and obtaining the upper and lower (left and right) boundary segment candidates of the connected black pixel region within that image.

SUMMARY OF THE INVENTION

A primary object of the present invention is therefore, the provision of a method for detecting character strings in a document image containing figures and illustrations.

Another object of the invention is the provision of a method for detecting character strings extending in one direction in a document image.

A further object of the invention is the provision of a method for detecting character strings in a document image at high speed and with high precision using a general-purpose computer.

Further and still other objects of the present invention will become more clearly apparent when the following description is read in conjunction with the accompanying drawings.

DETAILED DESCRIPTION

Figure 1:
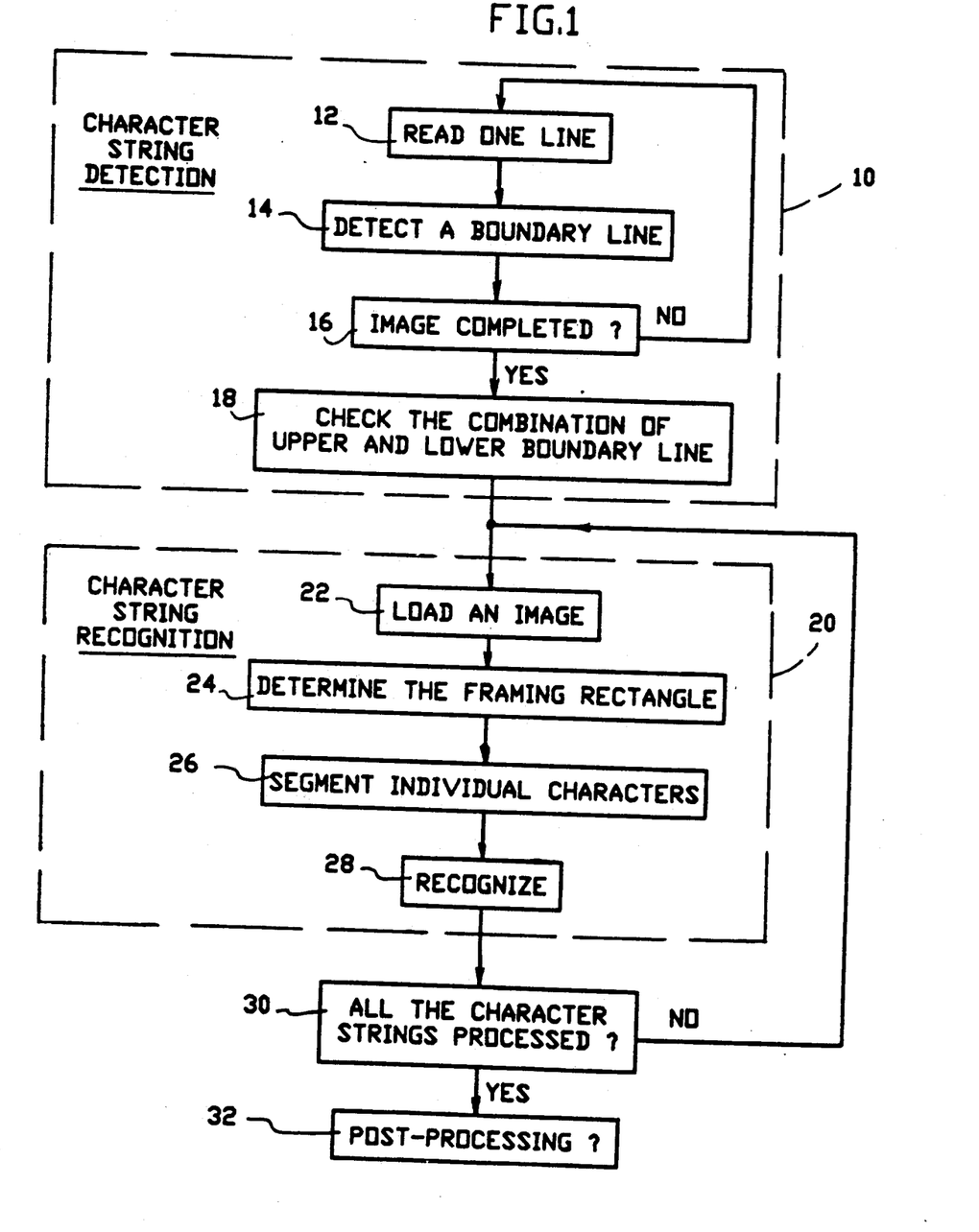
FIG. 1 is a flowchart of the present invention illustrating a processing of a parts number input system, as an example of an application of the invention.

Referring now to the figures and to FIG. 1 in particular where there is shown a flow diagram for the processing of an application for detecting character strings. The application used in the example is an input system of spare part numbers for automobiles. The invention is not limited to this or any other particular example or application. The system, in the present example, reads the exploded view of a figure found in a repair catalog (in which the illustration of each part and its number are printed) as partially shown in FIG. 2 by means of a scanner, extracting a character string representing a part number, and thereafter converting the part number to a character code by the use of a character recognition program. Since it is necessary to extract character strings contained along with illustrations throughout a large image (about 640 k bytes), the application has so far been considered difficult without the use of dedicated hardware or an engineering workstation.

As shown in FIG. 1, a first character string detection step 10 includes reading of one scan line of an image at step 12 and detecting a boundary line in step 14 based upon the reading of each scan line. After the detecting a boundary line step is performed, a decision is made in decision box 16 whether the image has been completely scanned. If the answer is no, the next line is read in at step 12 and the process continues. If the image has been completed, a check of the combination of upper and lower boundary lines is performed in step 18 as will be described hereinafter.

The checked and detected boundary lines from step 10 are provided to a second character string detection step 20 which step includes loading an image in step 22, determining the framing rectangle in the image in step 24, individual characters within the rectangle are segmented in step 26, in step 28 the individual characters are recognized. After the characters are recognized, a decision is made in box 30 whether all the character strings have been processed. If the decision is no, another image is loaded and the sequence of steps 22 to 30 is repeated. If all the character strings have been processed, additional post processing as described hereinafter is performed as step 32.

In a preferred embodiment of character string detection, an image is raster-scanned in order to read the image line by line and convert the read line image to a run-length representation. Thereafter, if the white run between two black runs is short, the two black runs are connected to form one black run, and its position data (in this case, the starting point and length) is generated and recorded. The resultant run is called a grouped run-length representation. The subsequent processing is performed on the grouped run-length representation and the image is not accessed.

Figure 3:
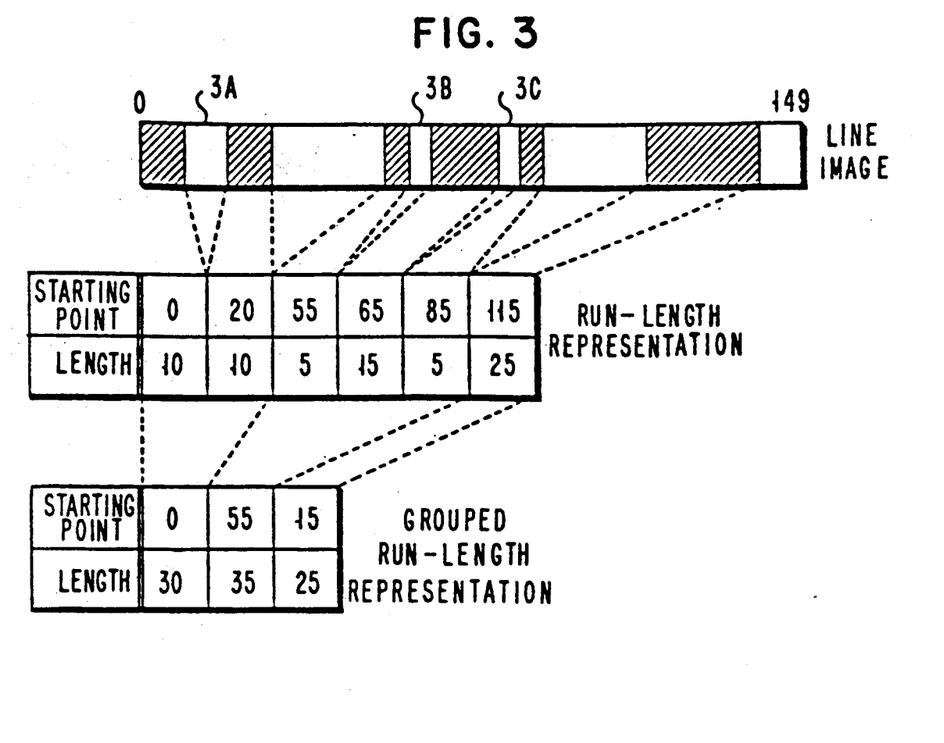
FIG. 3 is a figure illustrating a grouped run-length representation of a line image.

FIG. 3 exemplifies the conversion of a line image to a grouped run-length representation. As shown, white runs 3A, 3B and 3C which are less than 20 pixels in length are disregarded. For simplification, the intermediate run-length representation is described in FIG. 3, but actually, a grouped run-length representation is generated directly from a line image.

Figures 4, 4A:
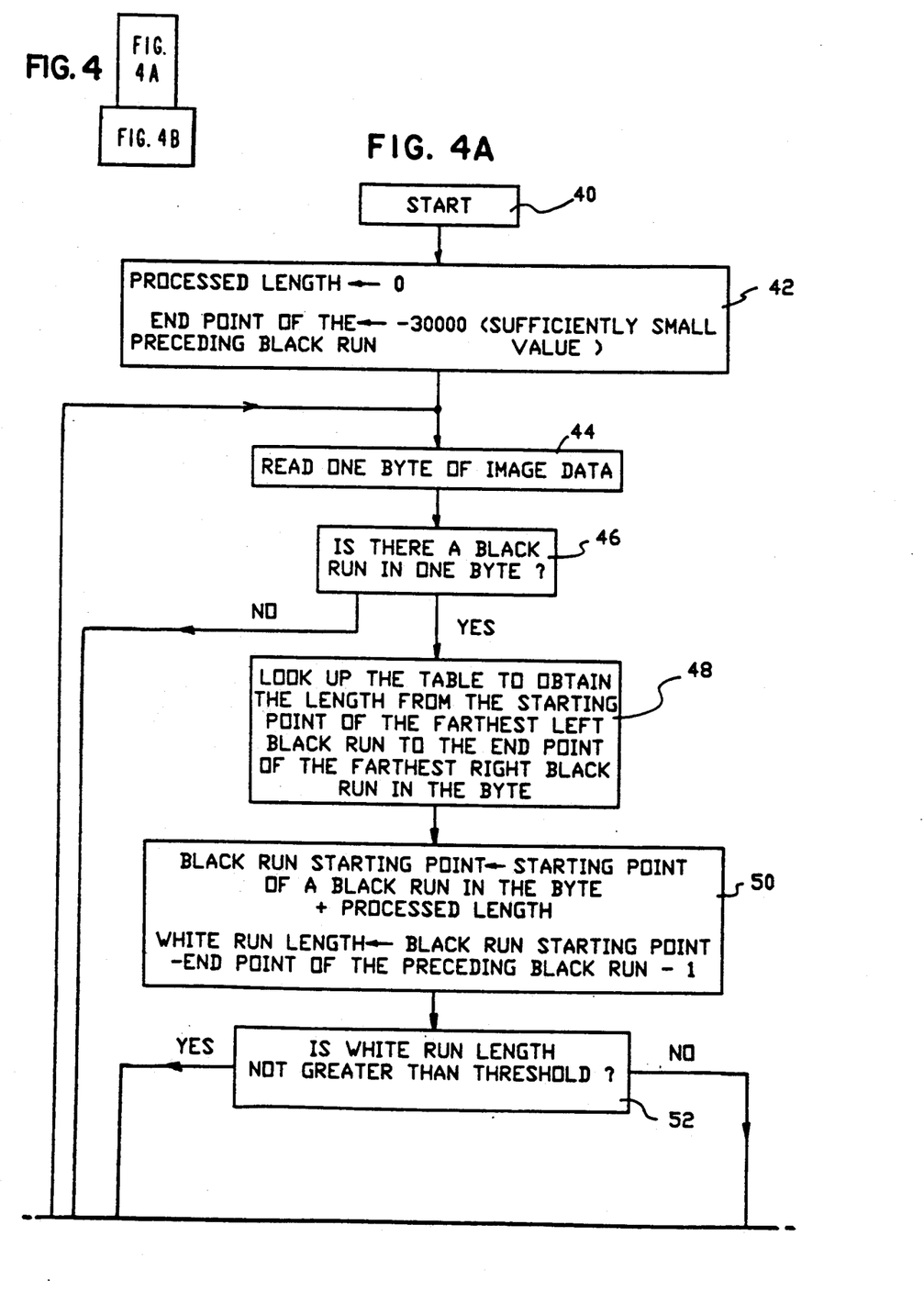
FIG. 4 is a flowchart of the process of converting a line image to a grouped run-length representation of a line image.
Figure 4B:
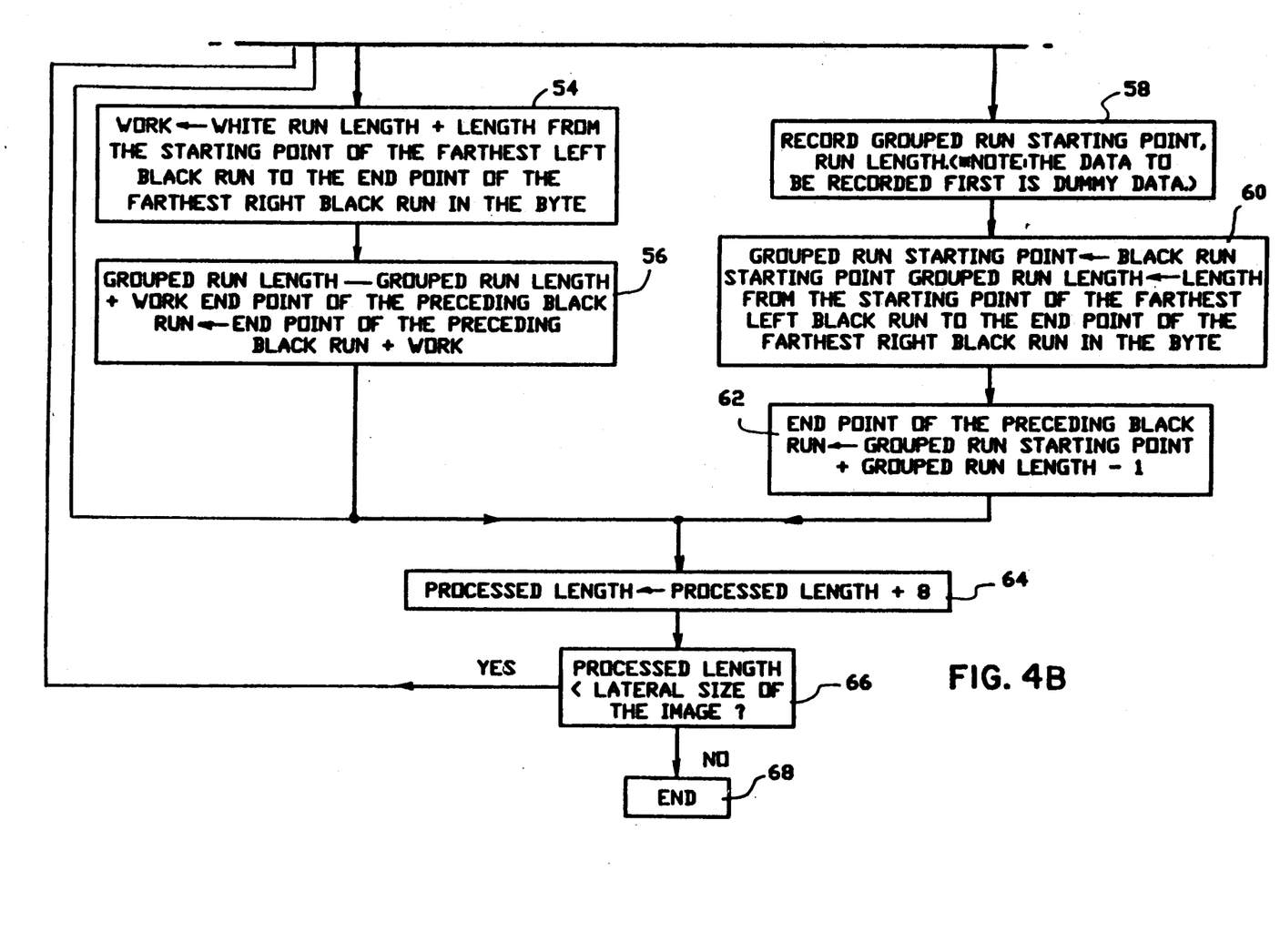

Although the conversion to a grouped run-length representation is originally a process which should be performed by checking an image pixel-by-pixel, in the present system, byte-by-byte or word-by-word processing is made possible according to a series of steps as shown in FIG. 4.

In FIG. 4, the process starts at 40. The input data at box 42 are the processed length and end point of the preceding black run. In step 44, one byte of image data is read. A decision is made in box 46 whether there is a black run in the byte. If yes, determination is made in step 48 of the length from the starting point of the farthest left black run to the end point of the furthest right black run in the byte. In step 50, the length of the white run length is calculated. Another decision in box 52 is made whether the white run length is greater than a predetermined threshold. If the length exceeds the threshold, a calculation of the white run length plus the length from the starting point of the farthest left black run to the end point of the farthest right black run in the byte is performed as step 54. Next, step 56 is the calculation of the grouped run length. If the decision in step 52 is no, the grouped run starting point and grouped run length are recorded in step 58. The grouped run starting point calculated as the black run starting point and the grouped run length is calculated as the length from the starting point of the farthest left black run to the end of the farthest right black run in the byte as determined in step 60. The end point of the preceding black run is calculated as the grouped run starting point plus the grouped run length minus 1 at step 62.

The next step when the decision in step 46 is no, or from step 56, or from step 62 is to update the processed length in step 64 by 8 for next byte. A decision is made at decision box 66 whether the updated processed length is less than the lateral size of the image. If yes, another byte of image data is read at step 44 and the process repeats. If the decision is no, the process ends at 68.

Figure 5:
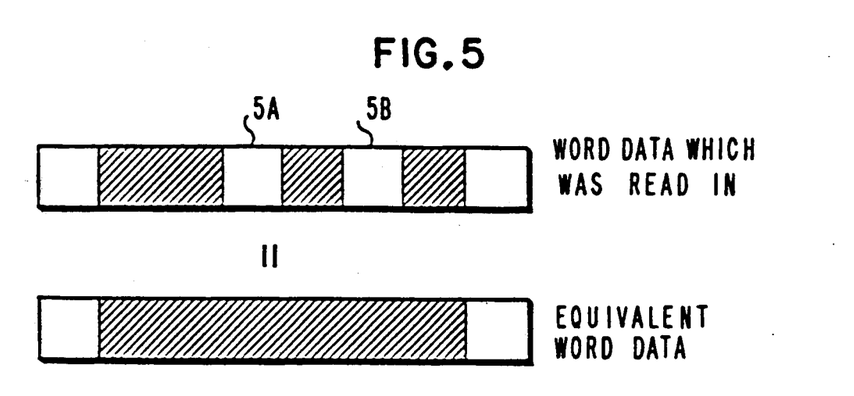
FIG. 5 is a figure illustrating a white run located between black runs in a byte (or word)

For grouping purposes, a white run shorter than a predetermined length is disregarded and represented as extensions of the black runs on the left and right thereof, however, the threshold is made larger than a byte length (8) or word length (16). Therefore, even if data of 8-bit or 16-bit length which has been read in contains a plurality of black runs as shown in FIG. 5, the black runs can be handled as being connected together without checking the lengths of the white runs 5A and 5B located between the black runs. Namely, the white runs 5A and 5B are neglected. For conversion to a run-length representation, it is enough if the starting point of the farthest left black run and the length from there to the end point of the farthest right black run are known. By calculating these values with respect to $2^8$ patterns for byte and $2^{16}$ patterns for word, tabulating them and referencing them, an image can be read in byte (word) by byte (word) to add the white run length at the right end of a certain byte (word) and the white run length at the left end of the next byte (word), for determining whether the white run is of a negligible length and converting the line image to a grouped run-length representation.

Figure 6:
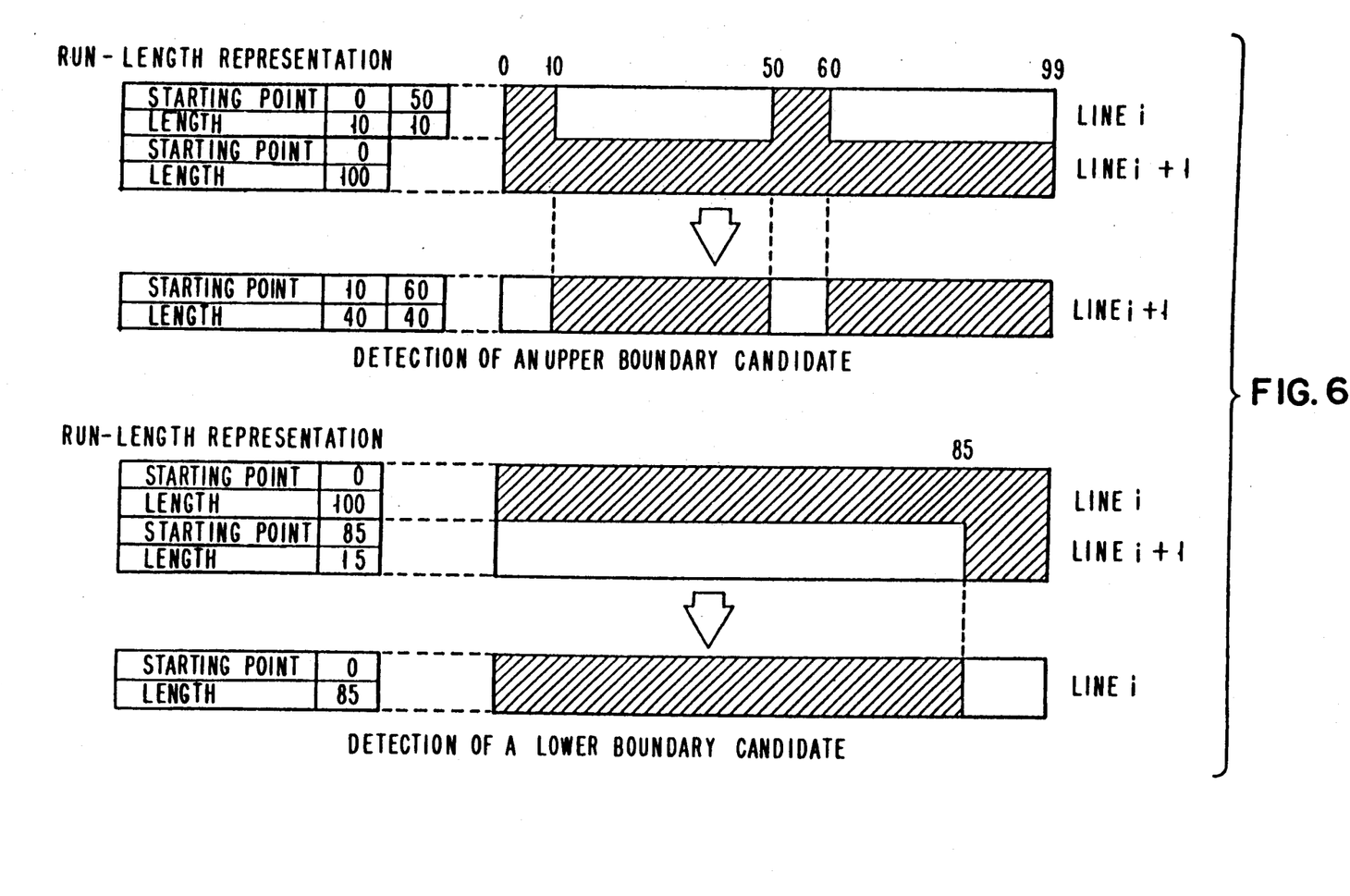
FIG. 6 is a figure illustrating upper boundary and lower boundary candidates.

When the image of two successive lines has been converted to a grouped run-length representation, the position data of the black run in the two lines are compared to detect whether the black runs are the upper and lower boundary candidates of a character string region (rectangle). As shown in FIG. 6, a black run with a white run above is judged to be part of the upper boundary candidate, and conversely, a black run with a white run below is judged to be part of the lower boundary candidate.

Figures 7, 7A:
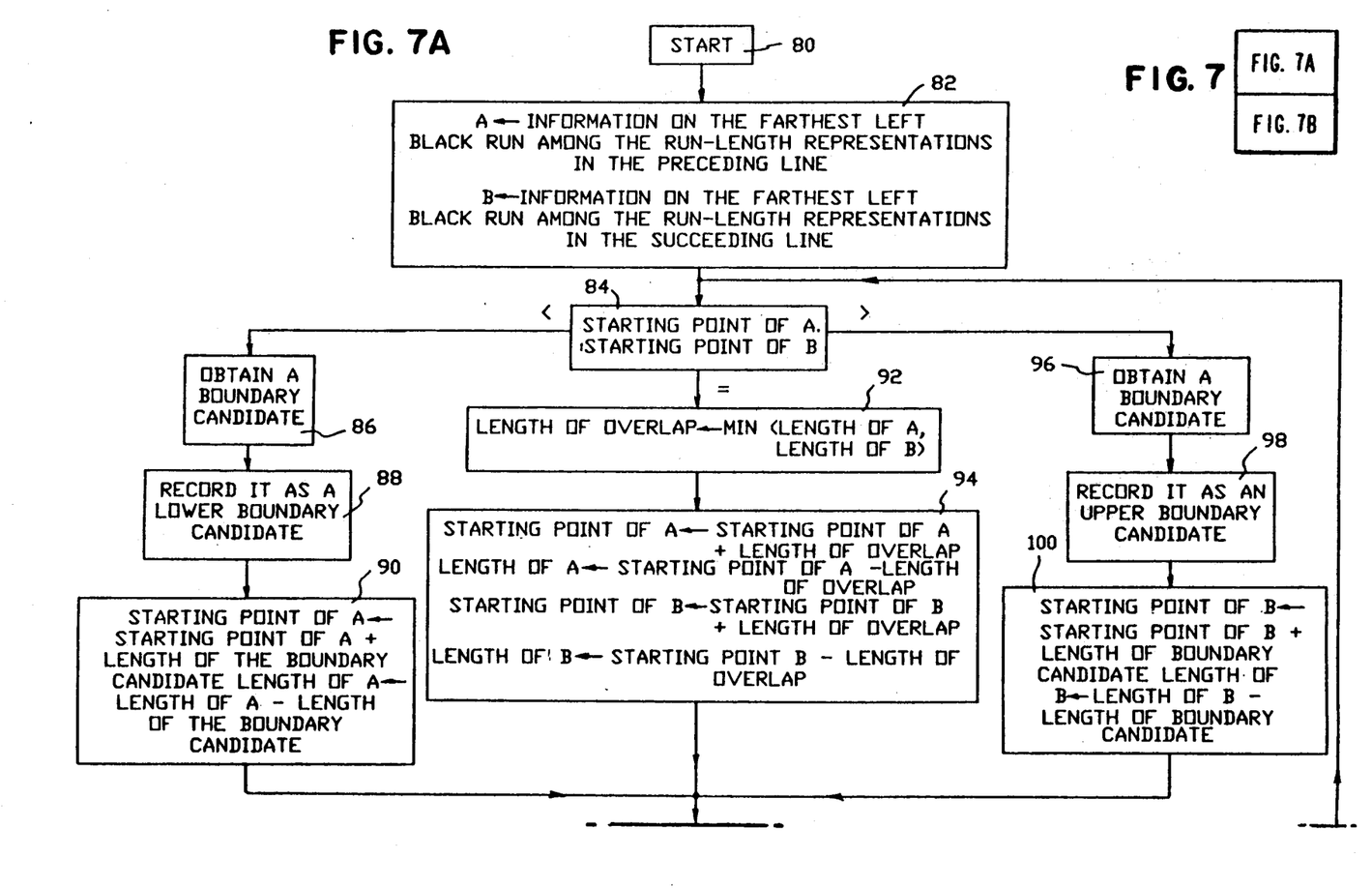
FIG. 7 is a flowchart of the process of comparing grouped run-length representations to detect boundary candidates.
Figure 7B:
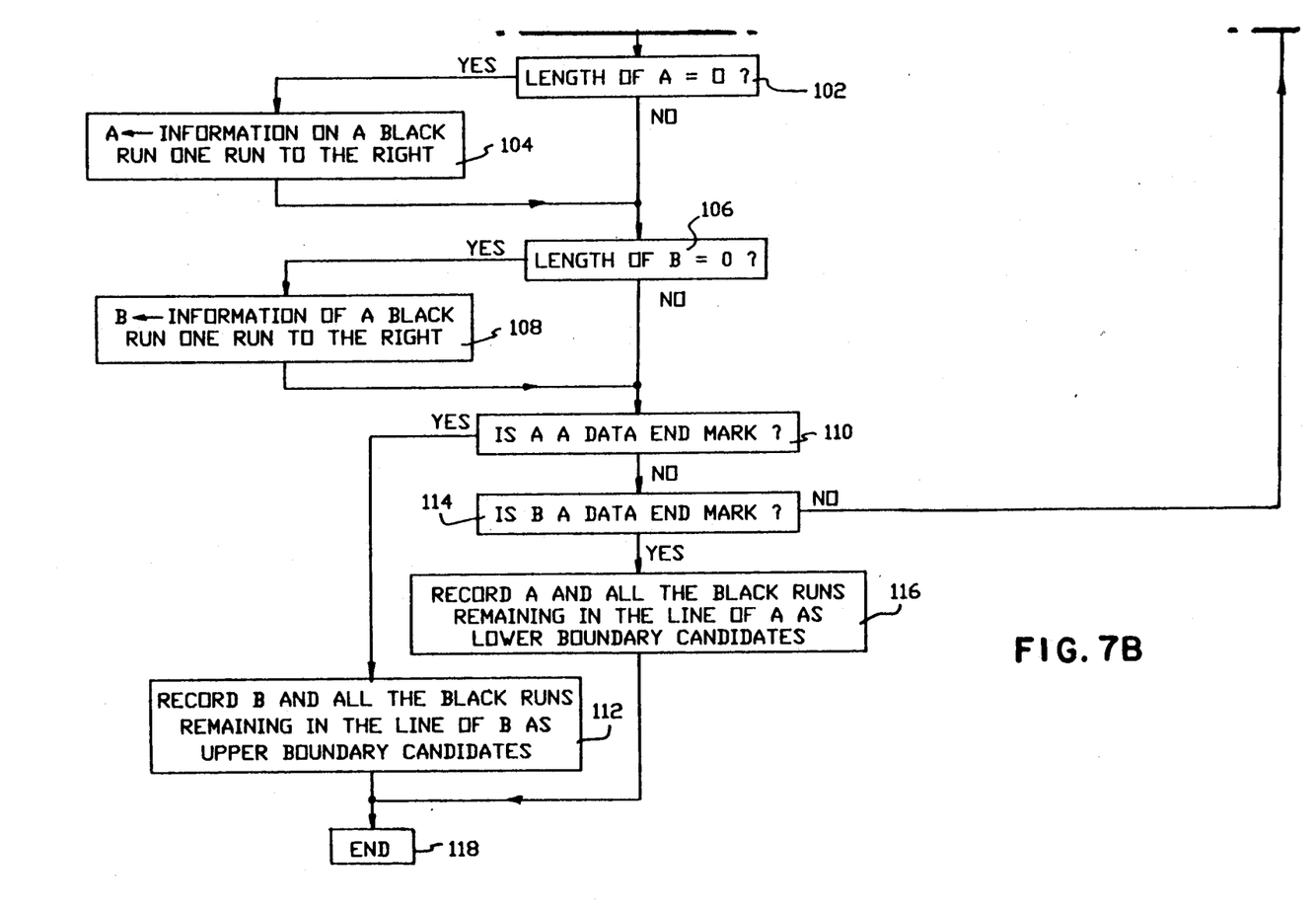

By comparing the position of the starting point and the length of a black run represented by a run-length according to a series of steps as shown in FIG. 7, the upper and lower boundary candidates can be detected. In FIG. 7, the position data of a black run means a combination of the starting point position and the length of a black run. Also, obtaining a boundary candidate during the processing of a figure means calculating the starting point and length of a boundary candidate.

The process shown in FIG. 7 starts at 80. A value of run A which is information concerning the farthest left black run among the run-length representations in the preceding line is entered and a value of run B which is information concerning the farthest left black run among the run-length representation in the succeeding line is obtained in step 82. A comparison is made at step 84 whether the starting point of run A is before or after or the same as the starting point of run B. If run A starts before B, a boundary candidate is obtained in step 86. The boundary is recorded as a lower boundary candidate in step 88. In step 90 the starting point of A is made equal to the starting point of A plus the length of the boundary candidate and the length of run A is made equal to the length of run A less the length of the boundary candidate. If it is determined at step 84 that run A starts at the same point as run B, in step 92 the length of overlap is determined as the minimum of the length of run A or the length of run B. In step 94, the starting point of run A is set equal to the starting point of run A plus the length of the overlap. The length of run A is set equal to the starting point of run A less the length of the overlap. The starting point of run B is set equal to the starting point of run B plus the length of the overlap. The length of run B is made equal to the starting point of run B minus the length of the overlap. If it is determined at step 84 that the starting point of A is after the starting point of B, a boundary candidate is obtained in step 96. In step 98, the boundary candidate is recorded as an upper boundary candidate. In step 100, the starting point of B is set equal to the starting point of B plus the length of the boundary candidate. The length of run B is set equal to the length of run B minus the length of the boundary candidate in step 98.

After performing either step 90, 94 or 100, as a result of the decision at step 84, a decision is made in step 102 whether the length of run A is zero. If the decision is yes in step 104, run A is set to the information of a black run one run to the right. If the length of A is not zero or after setting A in step 106, another decision is made at box 104 whether the length of B is zero. If the decision is yes in step 108, run B is set to the information of a black run one run to the right. If the length of B is not zero or after setting B in step 108, a decision is made in step 110 whether A is a data end mark. If the answer if yes, run B and the black runs remaining in the line of run B are recorded as upper boundary candidates in step 112 and the process ends at 118. If it is decided that run A is not a data end mark, a decision is made at step 114 whether run B is a data end mark. If the answer at step 114 is no, the process repeats for the next data at decision box 84. If B is a data end mark, run A and all the black runs remaining in the line of run A are recorded as lower boundary candidates in step 116 and the process ends at 118.

Figure 8A:
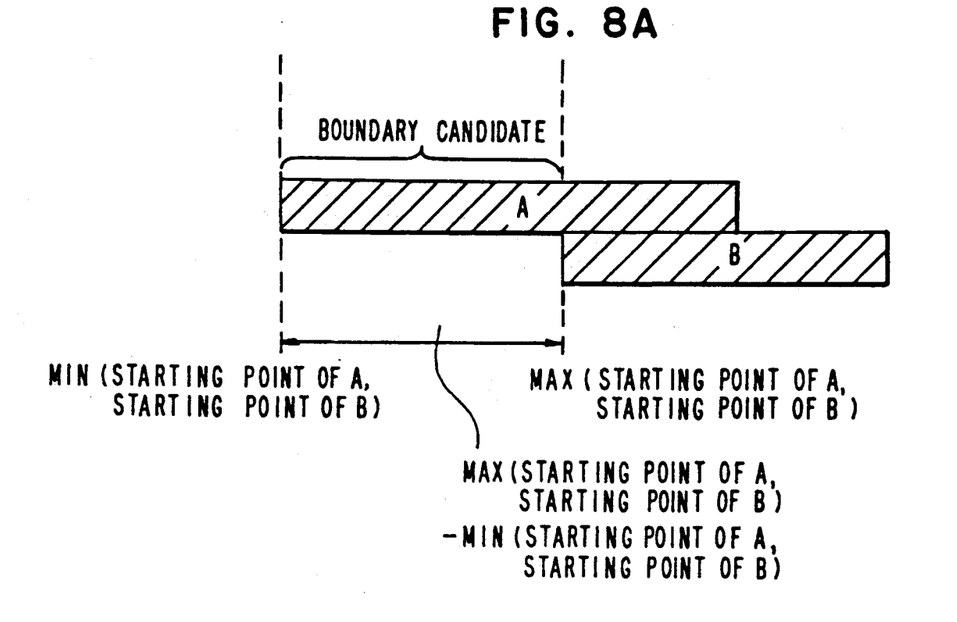
FIGS. 8A and 8B are figures illustrating boundary candidates detected for two different cases.
Figure 8B:
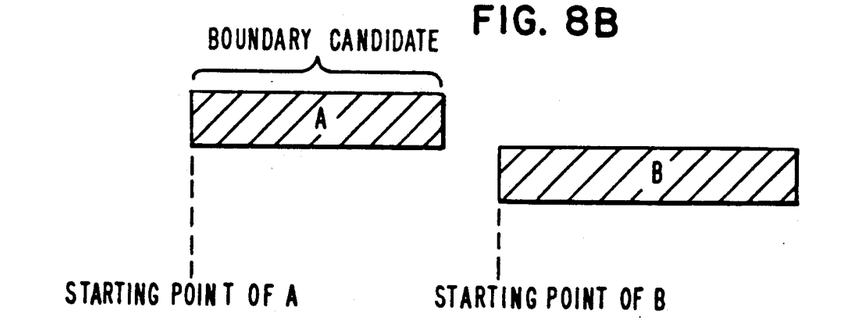

For instance, as shown in FIG. 8A, if a black run A overlaps a black run B below, a run will be obtained whose starting point is minimum(starting point of A, starting point of B) and whose length is maximum(starting point of A, starting point of B)−minimum(starting point of A, starting point of B). In the case where there is no overlapping between black runs A and B as shown in FIG. 8B, the position data of either A or B, the one having a earlier starting point value, will be obtained.

When the detection of boundary candidates is to be performed over a whole image, a region for recording a grouped run-length representation is prepared for two lines, and after the comparison of the data of the i-th line and the data of the i+1-th line is completed, the data of the i+1-th line is moved to the region where the data of the i-th line was located (actually, only reassignment of a pointer is sufficient), and the grouped run-length representation of the image of the i+2-th line is set in the region where the data of the i+1-th line was.

Figure 9A:
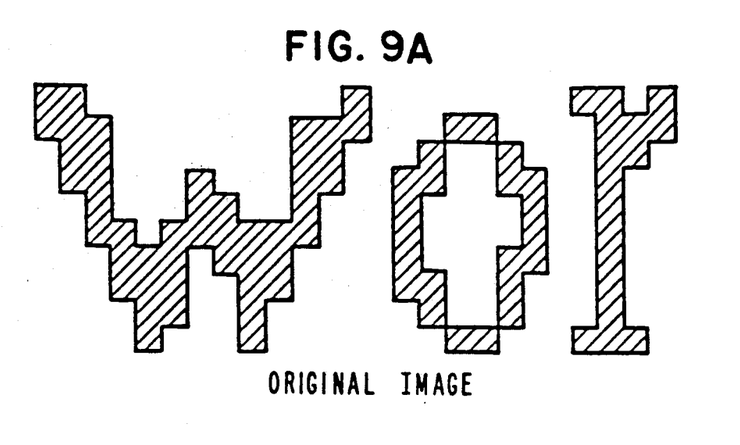
FIGS. 9A-9C are figures illustrating the process of connecting the gaps in the vertical direction and the disconnections to the right or left of boundary candidates.
Figure 9B:
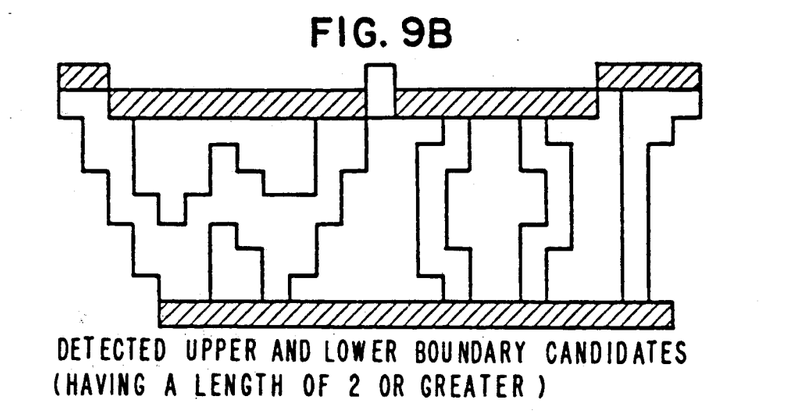
Figure 9C:
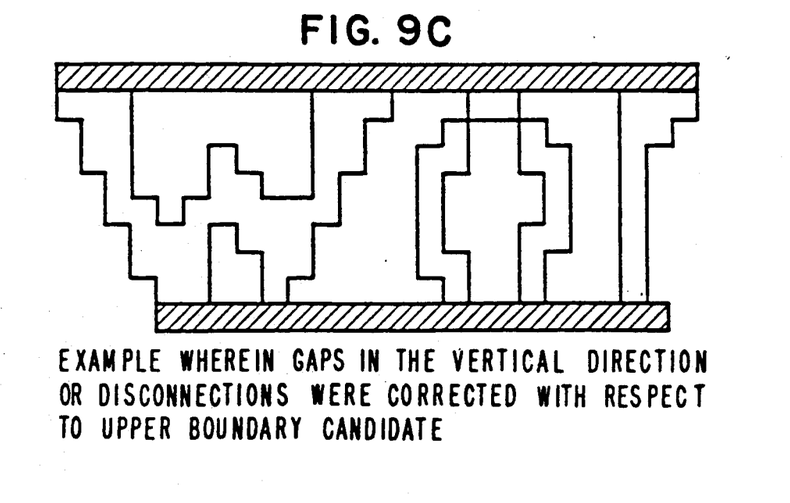

After the detection of a boundary candidate, a processing for connecting gaps in the vertical direction, or disconnections to the left or right may be performed within an appropriate threshold, as shown in FIGS. 9A-9C.

All the upper boundary candidates are checked for whether there is any lower boundary candidate satisfying the following conditions.

Condition 1: A lower boundary candidate exists below the upper boundary candidate, and the difference of the Y-coordinate is within a certain range (between the minimum value and the maximum value of the character heights). Here, the Y-axis corresponds to the sub-scanning direction.

Condition 2: The starting point positions and the lengths of two boundary segment candidates are equal within a certain threshold. If these conditions are satisfied, it is judged that a character string region exists, the upper and lower ends of which constitute at least parts of the two boundary segment candidates respectively.

Figure 10:
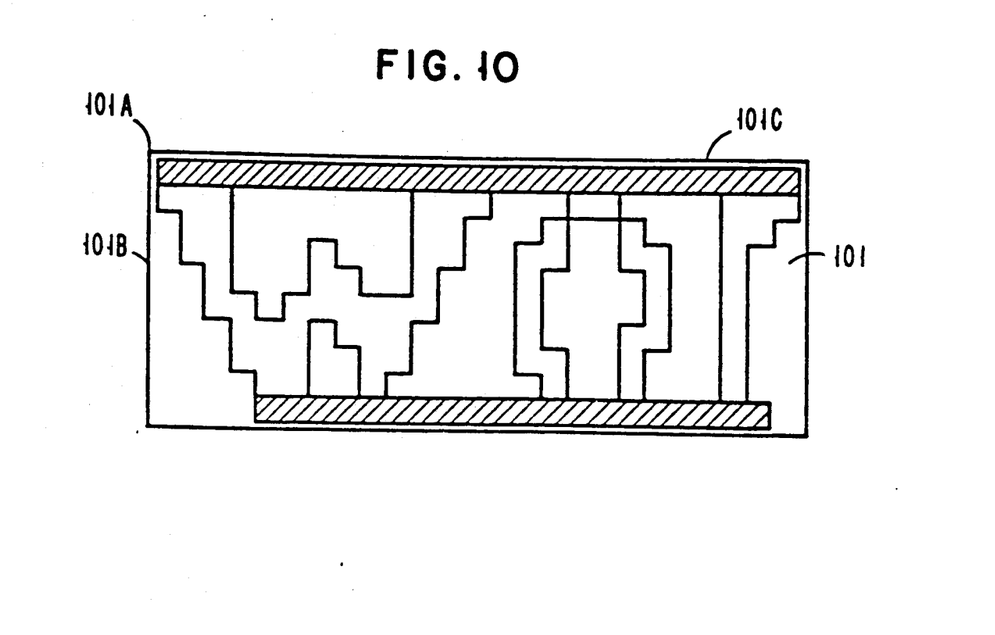
FIGS. 10 and 11 are figures illustrating rectangles judged to be a character string region.
Figure 11:
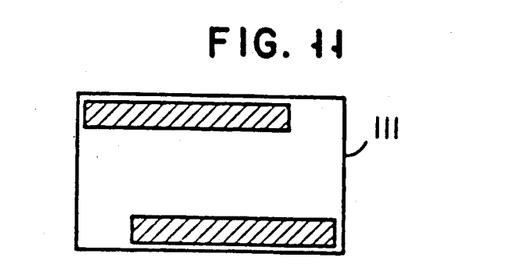

A rectangle judged to be a character string region, based on the combination of an upper segment candidate and a lower segment candidate, can be changed in any manner, depending on the implementation (threshold). In this application, using a pair of upper and lower boundary candidates as shown in FIG. 9C as an example, the starting point positions and the lengths are determined to be equal within a certain threshold, and a rectangle 101, as shown in FIG. 10, is judged to be a character string region. And, the position (XY-coordinates) of the upper left apex 101A and the lengths of two sides 101B and 101C are generated as the position data of rectangle 101. Using a pair of upper and lower boundaries as shown in FIG. 11 as an example, rectangle 111 is judged to be a character string region and its position data is generated.

A rectangle whose upper and lower ends are boundary segment candidates is not necessarily the framing rectangle of a character string, but, as described above, if only the rough position and size of the character string is known, it is easy to correct the boundaries when segmenting or recognizing the individual characters.

In the application of FIG. 1, the character string detecting routine scans an image once and then writes the position data of the detected character string in a table. The system loads the image around the character string according to the data in this table, obtains the correct framing rectangle of the character string, and performs the segmentation and recognition of the individual characters. If the character string detecting routine happens to detect part of an illustration as a character string, the data is checked and rejected in the process of segmenting and recognizing the characters.

The post-processing routine 32 as shown in FIG. 1 is a routine which performs checking and recovery of errors utilizing the knowledge specific to an application.

Figure 2:
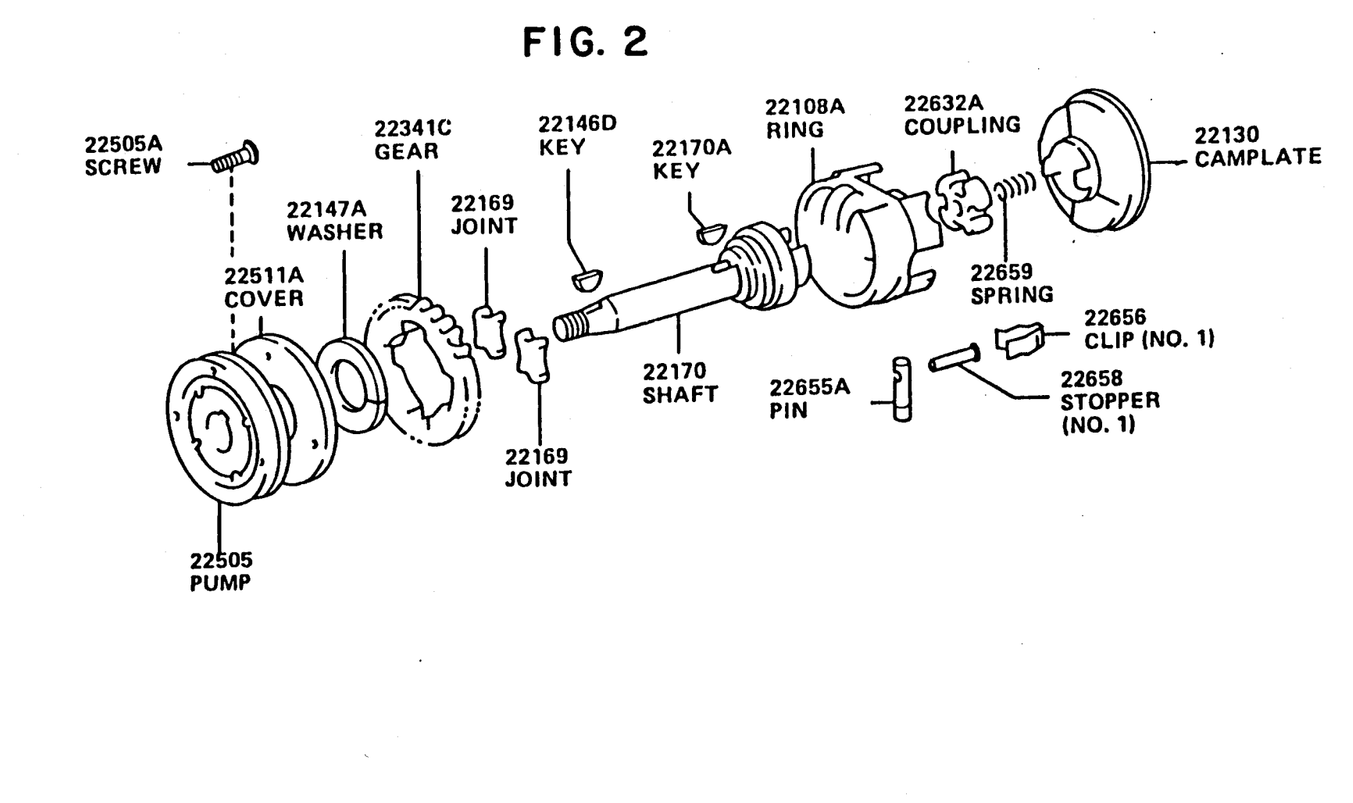
FIG. 2 is an example of drawing to be processed according to the present invention.

The advantages of the described embodiment are that access to an image according to this invention requires only one raster scan and is made byte-by-byte or word-by-word. Therefore, a processing speed faster than that of any of the prior methods can be expected. Actually the implementation was achieved on a personal computer (CPU: Intel 80286 at 8 MHz with memory wait) using C language, and character string detection was performed with respect to a drawing, about 1/6 of which is shown in FIG. 2, all the parts numbers were detected in 37 seconds (exclusive of inputting of the image). According to this invention, even a character string in contact with a character string and/or a figure in an illustration can be detected without any problem. Indeed there may be a character string which will be connected with the left or right adjacent figures due to disregarding of short white runs, but the upper and lower boundaries themselves will not disappear due to contact with any other figure.

Since this invention performs the processing on a run-length representation and the scanning of an image requires only one raster scan, it is easy to process the data compressed by the MH method or MMR method. This is a characteristic feature which is not found in the conventional methods of using histograms, considering the complexity of a figure, and detecting character strings from a preprocessed image.

The memory required when scanning an image according to the present invention is only that required for one scan of the image line and the run-length representation of two scan lines. The boundary segment candidate recorded in the course of scanning is a result obtained by performing three stages of compression and screening, that is, conversion to a run-length representation, filling in the white run to be represented by only one black run, and leaving the run that is to become the upper or lower boundaries, therefore, only a small main memory storage area is required.

In any method, once the framing rectangles of character strings have been obtained, it is possible to select the character strings of specific dimensions, but, in this invention, character strings beyond a specified range can be screened in the process of detection. For this reason, the detection of a character string of a heading, for example, can be done at a higher speed than in other methods.

A horizontal segment can be detected as well as a character string. (If the difference between the Y-coordinates of the upper boundary segment candidate and the lower boundary candidate is below the threshold, it is determined to be a horizontal segment rather than a character string.) Detection of an underline in contact with "y" or "q" is possible, which is useful information when segmenting individual characters.

The foregoing description has been presented in conjunction with the case where a character string (consisting of a number of characters) to be read extends in the lateral direction (the direction of the main scanning of a raster scan). If a character is vertically written, it would be sufficient if only the direction in which the character string extends in the image is made to match the direction of the main scanning of said image by rotating the image in the preprocessing (hardware that will perform a rotation of 90 degrees has become available in personal computers), or rotating a drawing and inputting the rotated drawing at the time of scanning, etc.

If one character is written a long distance apart from other characters, it can be accommodated to a certain extent by determining the appropriate threshold value in examining the combination of an upper and lower boundary segment candidates. However, the instances of incorrectly detecting figures other than characters as a character will increase.

The present invention has a disadvantage when a document to be read includes character strings extending in various directions, but it is very advantageous for a document including character strings extending substantially in only one direction.

According to this invention, character strings in the image obtained by reading a document including only character strings extending substantially in one direction can be detected at a high speed and with a high precision. In addition, this invention can easily be implemented on a general-purpose personal computer.

While there has been described and illustrated a method for detecting character strings, it will be apparent to those skilled in the art that modification and variations are possible without deviating from the broad principles of the invention which shall be limited solely by the scope of the appended claims.

What is claimed is:

1. A method for detecting character string regions in an image obtained by scanning in a direction a document including a plurality of character strings extending substantially in one direction comprising the steps of:
    (a) storing image data of said document into an image memory with a direction in which character strings extending in the image are aligned with the scanning direction;
    (b) generating position data of a black run in each line by accessing said image memory to scan said image;
    (c) comparing data of black runs obtained in the step (b) for each pair of two adjoining lines, and when a part of a black run which does not adjoin a black run in a preceding line exists in a succeeding line, judging the part to be a boundary candidate of the first kind, generating position data thereof, and storing the data in a table of a storage means, and when a part of a black run which does not adjoin a black run in a succeeding line exists in a preceding line, judging the part to be a boundary candidate of the second kind, generating position data thereof, and storing the data in said table, and
    (d) looking up said table to determine a pair consisting of a boundary candidate of the first kind and that of the second kind, which have a part whose position for said main scanning direction is common, judging a rectangular region whose boundaries include at least a part of each boundary candidate of the determined pair to be a character string region, and generating position data thereof.

2. A method as claimed in claim 1 wherein in said step (b), when the length of a white run located between black runs is not greater than a predetermined value, said white run is recognized to be a part of a grouped black run formed together with the two adjoining black runs, and position data of said grouped black run is generated.

3. A method as claimed in claim 1 wherein after said step (c), when the space between the boundary candidates of the same kind detected on the same line has a length not greater than a predetermined value, said space is recognized to be a part of a grouped boundary candidate formed together with the two adjoining boundary candidates, and position data of said grouped boundary candidate is generated.

4. A method as claimed in claim 1 wherein after said step (c), when there is a space between the boundary candidates of the same kind detected on the same line having a length not greater than a predetermined value with respect to a sub-scanning direction between two boundary candidates of the same kind which are contiguous with respect to said main scanning direction, one boundary candidate is recognized to be a part of a grouped boundary candidate formed together with the other boundary candidate, and position data of said grouped boundary candidate is generated.

5. A method as claimed in claim 1 wherein in said step (d), if the distance between said boundary candidates of the first kind and second kind of the determined pair is within a predetermined range and the gap between said two boundary candidates with respect to the main scanning direction is not greater than a predetermined value, a rectangular region whose boundaries include at least a part of each boundary candidate of the determined pair is judged to be a character string region, and position data thereof is generated.

6. A method as claimed in either one of claim 1 wherein the position data of each black run generated in said step (b) includes data of the starting point position and length of said black run.

7. A method as claimed in either one of claim 2 wherein the position data of each black run generated in said step (b) includes data of the starting point position and length of said black run.

8. A method as claimed in any one of claims 1 wherein the position data of each boundary generated in said step (c) includes data of the starting position and length of said boundary.

9. A method as claimed in any one of claim 3 wherein the position data of each boundary generated in said step (c) includes data of the starting position and length of said boundary.

10. A method as claimed in any one of claim 4 wherein the position data of each boundary generated in said step (c) includes data of the starting position and length of said boundary.

11. A method as claimed in either one of claim 1 wherein the position data of a character string region generated in said step (d) includes data of one apex and two orthogonal sides of the rectangular region judged to be a character string region.

12. A method as claimed in either one of claim 5 wherein the position data of a character string region generated in said step (d) includes data of one apex and two orthogonal sides of the rectangular region judged to be a character string region.

* * * * *